(12) United States Patent
Millner

(10) Patent No.: US 6,295,960 B1
(45) Date of Patent: Oct. 2, 2001

(54) INTAKE MANIFOLD COMMUNICATION VALVE

(75) Inventor: Timothy Joseph Millner, Allen Park, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/482,132

(22) Filed: Jan. 12, 2000

(51) Int. Cl.⁷ ....................................................... F02B 27/02
(52) U.S. Cl. ......................................................... 123/184.59
(58) Field of Search ........................ 123/184.26, 184.36, 123/184.44, 184.49, 184.59

(56) References Cited

U.S. PATENT DOCUMENTS

| 4,932,369 | 6/1990 | Parr .................................. 123/52 MB |
| 4,949,681 | 8/1990 | Schatz et al. ............................ 123/26 |
| 5,125,369 | 6/1992 | Hitomi et al. ....................... 123/52 M |
| 5,438,964 | 8/1995 | Breidenbach ..................... 123/184.55 |
| 5,492,093 | * | 2/1996 | Rygiel ................................... 123/306 |

FOREIGN PATENT DOCUMENTS

4032727-A1 * 4/1991 (DE) ............................... 123/184.36

* cited by examiner

Primary Examiner—Tony M. Argenbright
Assistant Examiner—Hyder Ali
(74) Attorney, Agent, or Firm—Jerome R. Drouillard

(57) ABSTRACT

An air intake system for a multi-cylinder combustion engine comprising a left side plenum and a right side plenum is disclosed. Each of the plenums is connected to a plurality of air intake passages for passing air to a plurality of engine cylinders. A communication valve is provided for connecting the left side plenum with the right side plenum. A short balance plenum is connected between the communication valve and at least one of the plenums. A long balance plenum is connected between the communication valve and at least one of the plenums. The communication valve includes a valve body having an axis and a sealing section rotatable through 360 degrees around the valve body axis. The sealing section is disposed for selectively closing air flow from the short balance plenum and the long balance plenum.

19 Claims, 3 Drawing Sheets

INTAKE MANIFOLD COMMUNICATION VALVE

BACKGROUND OF THE INVENTION

1. Field of the Invention

This invention relates generally to an air intake system in an internal combustion engine and the associated valves and manifolds and plenums for passing air to the engine.

2. Discussion of the Related Art

Internal combustion engines (ICEs) include intake manifolds, also known as plenums, for feeding air to the cylinders so that the combustion process can occur. In engines containing two manifolds (also known as main plenums), balancing the air flow between the two manifolds has been found to be important for reasons of fuel economy and performance. To accomplish this balancing, it is efficient to connect the two manifolds with a short balance tube (or plenum) and a long balance tube (or plenum). In each of these balance tubes, an on-off valve is disposed. The on-off valve can rotate 90 degrees between its open and closed positions. Each of these two valves is a flat shutoff valve that is electrically actuated and contains flat valve members that are disposed across a diameter of the valve body housing for sealing.

FIG. 1 shows such a prior art device including a valve housing 100 that can receive a valve body (not shown) to allow flow between the left side manifold 110 and the right side manifold 120. A long balance plenum 140 is attached to a portion of the left manifold 110 and the end of the long balance plenum 140 connects to a valve housing 150. The other side of the valve housing 150 is connected to the right manifold 120 by a short connection tube 160.

A short balance plenum 145 is attached to an end of the left manifold 110 and the end of the short balance plenum 145 connects to a valve housing 100. The other side of the valve housing 100 is connected to an end of the right manifold 120.

The long plenum 140 and the short plenum 145 typically have an inner diameter that is smaller than the manifolds 110 and 120. The left manifold 110 also allows air to flow into air intake passages 112, 114 and 116, each of which is attached to respective cylinder heads (not shown) of the engine. Likewise, the right manifold 120 also allows air to flow into air intake passages 122, 124 and 126, each of which is attached to respective cylinder heads of the engine.

In operation, air is fed through an air inlet 170 to each of the plenums (or manifolds) 110 and 120 to the air intake passages 112, 114, 116, 122, 124 and 126. Initially, both valves in valve housings 100 and 150 are in their closed positions. As the need for balancing the air flow between the main plenums 110 and 120 increases with engine performance, the valve in valve housing 100 is opened to allow some balancing through the short plenum 145. As engine speed increases, additional balancing is needed and so the valve in valve housing 100 is closed and simultaneously with its closure, the valve in valve housing 150 is opened. Finally, both valves are opened to provide for maximum balancing between the two manifolds 110 and 120.

SUMMARY OF THE INVENTION

An object of this invention is to provide a single valve structure that can accomplish the task of balancing the air flow that is currently done with two valves.

It is a further object of the invention to provide a plenum structure and single valve arrangement that is simplified, reduces packaging space in the engine and eliminates the need for having multiple valves to balance air flow.

The above objects are achieved, and the prior approaches are overcome by routing the air flow balancing plenums to a common location and by using a single valve that can rotate 360 degrees. Specifically, by using a single valve that can block off flow to one quadrant (or 90 degrees) at a time, balancing of the air flow can be accomplished efficiently and inexpensively compared to the prior art multiple valve structures.

The objects of the invention are also accomplished by an air intake system for a multi-cylinder combustion engine comprising a left side plenum and a right side plenum. Each of the plenums is connected to a plurality of air intake passages for passing air to a plurality of engine cylinders. A communication valve is provided for connecting the left side plenum with the right side plenum. A short balance plenum is connected between the communication valve and at least one of the plenums. A long balance plenum is connected between the communication valve and at least one of the plenums. The communication valve includes a valve body having an axis and a sealing section rotatable through 360 degrees around the valve body axis. The sealing section is disposed for selectively closing air flow from the short balance plenum and the long balance plenum. The communication valve is disposed at an intersecting location of the short balance plenum, the long balance plenum and at least one of the right side plenum and the left side plenum. Further, the communication valve includes a sealing section that is movable between at least four distinct positions.

BRIEF DESCRIPTION OF THE DRAWINGS

The above and other objects and features of the present invention will be clearly understood from the following description with respect to a preferred embodiments thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 2:
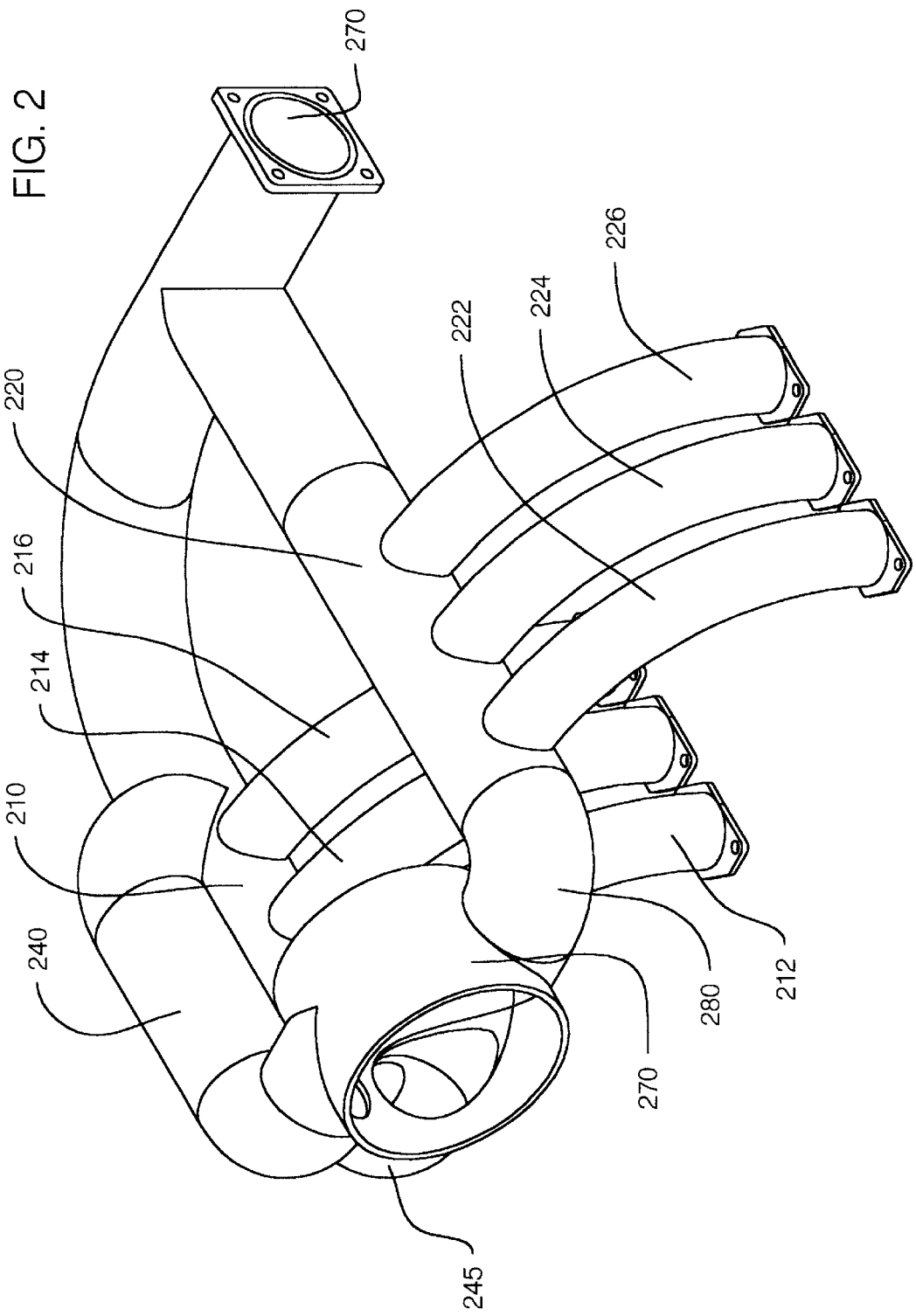
FIG. 2 is a schematic perspective view of the air intake system including a single communication valve according to the present invention.

FIG. 2 illustrates a perspective view of one aspect of the preferred embodiments using a single communication valve disposed between a left side plenum 210 and a right side plenum 220. The left manifold 210 allows air to flow into air intake passages 212, 214 and 216, each of which is attached to respective cylinder heads (not shown) of the engine. Likewise, the right manifold 220 also allows air to flow into air intake passages 222, 224 and 226, each of which is attached to respective cylinder heads of the engine (not shown).

A long balance plenum 240 is provided that is connected at one end to the left plenum 210 and the other end of plenum 240 is connected to a valve housing 270. A short balance plenum 245 is provided so that it is connected to an end of the left plenum 210 and also connects to the valve housing 270. The other side of the valve housing 270 is connected to a connection plenum 280 that allows flow to the end of the right plenum 220.

Thus the valve housing 270 is connected on one side with the long balance plenum 240 and the short balance plenum 245 and on the other side to the connection plenum 280 for allowing flow to the right plenum 220.

Figure 1:
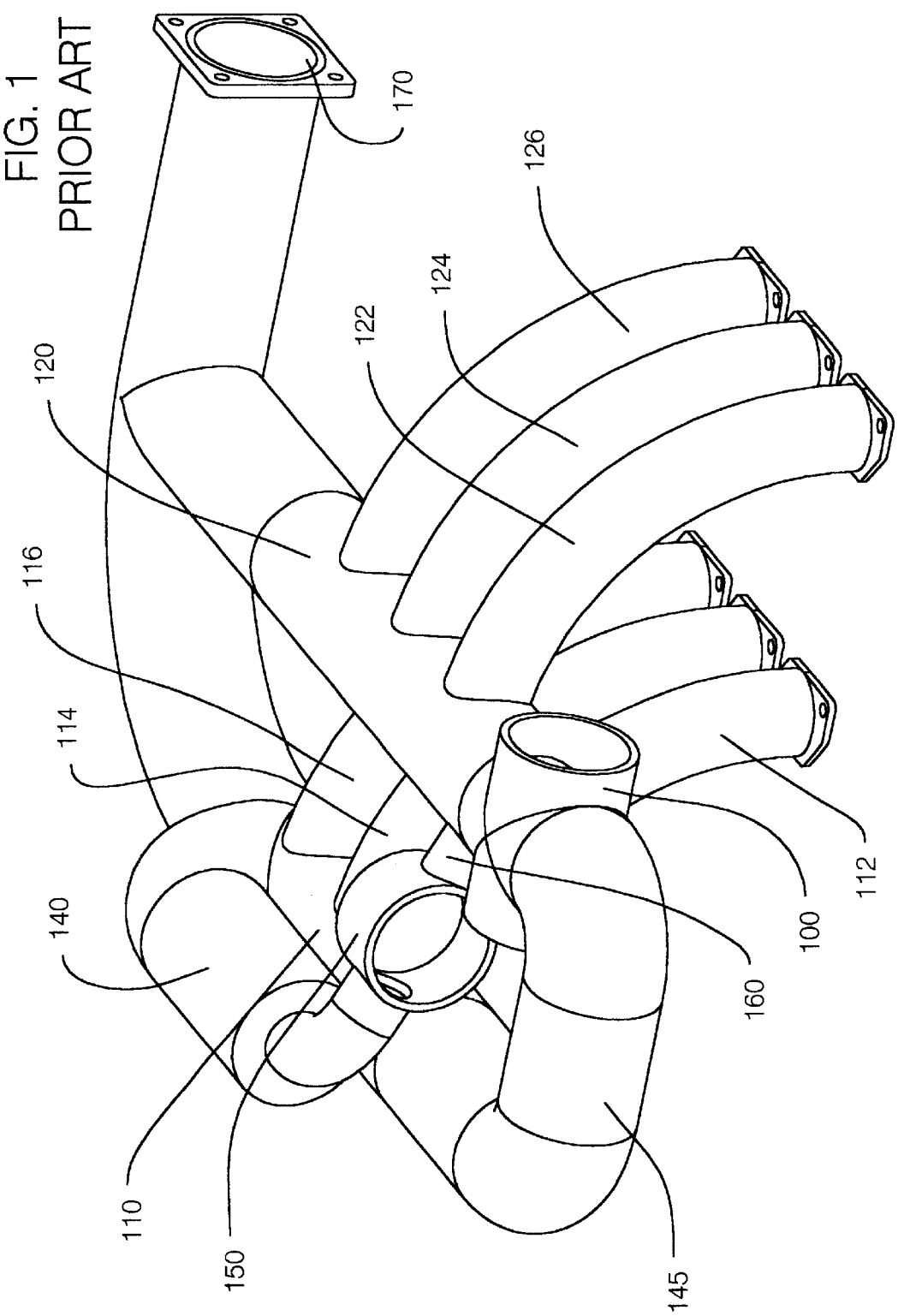
FIG. 1 is a schematic perspective view of a prior art air intake system.

While the valve housing 270 has been enlarged for ease in understanding of FIG. 2, it is contemplated that this valve housing has the same size as valve housings 100 and 150 in FIG. 1.

Figure 3:
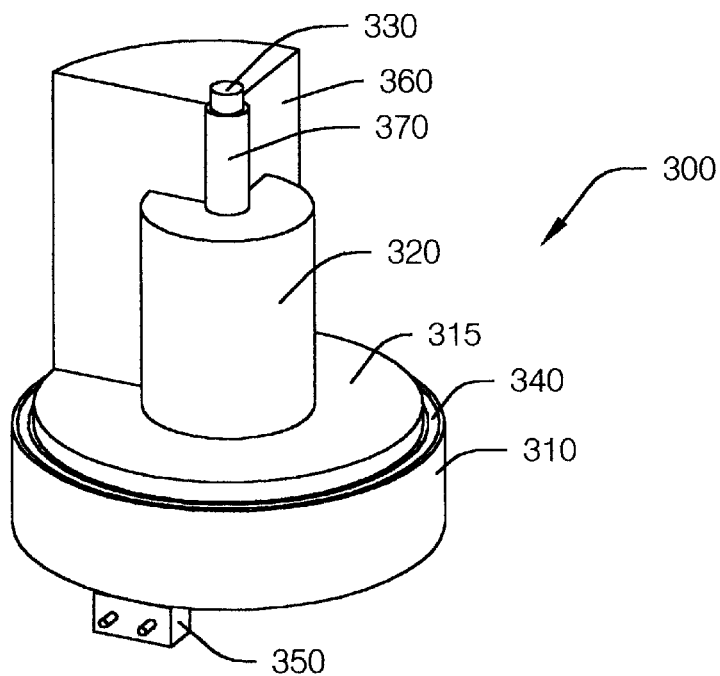
FIG. 3 is a perspective view of one type of communication valve showing an air flow blocking section of approximately 90 degrees according to the present invention.

Control of the air flow is accomplished by a valve 300 such as is shown in FIG. 3. The valve 300 includes main body portion 310 with a seal contacting surfaces 315 and 320. Beneath these surfaces the electric motor is housed for actuating the valve body member 330 disposed along a longitudinal axis of the valve 300. The valve 300 also includes a sealing section 360 and a seal attachment portion 370 that can be disposed around the valve body member 330. Rotation of the valve body member 330 actuates the sealing section 360 and the seal attachment portion 370 to rotate around the valve 300. The valve 300 can be designed to have the sealing section 360 rotate in either a clockwise direction or a counterclockwise direction. It is also possible to have the sealing section rotate in both positions. The valve 300 also includes an electrical connection plug 350 for connection to an electric power source in the vehicle.

Figure 4:
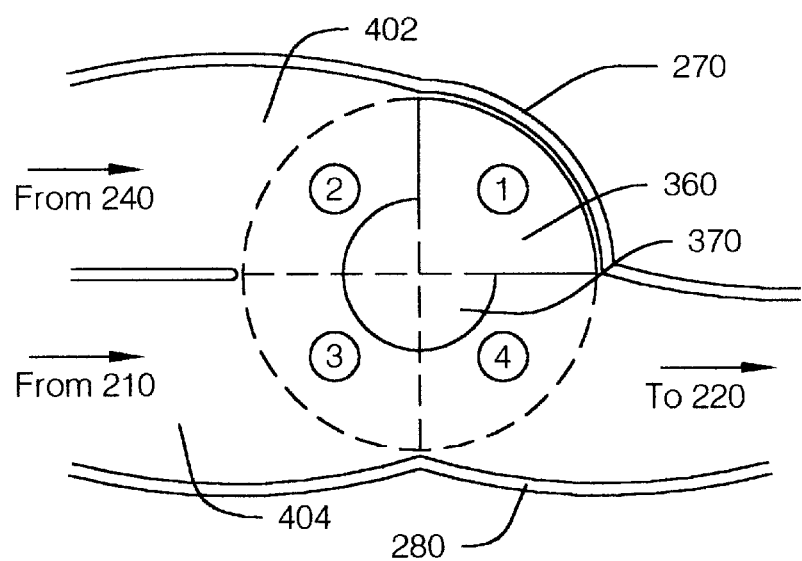
FIG. 4 is a schematic detailed view of the connections from the various air plenums to the communication valve as well as the four quadrants that can be controlled by the valve according to the present invention.

As seen in FIG. 4, the sealing section 360 is substantially sector-shaped in cross section. FIG. 4 is a schematic drawing showing the valve disposed at an intersecting location of the long plenum 240, the short plenum 210 and at least one of the right or left plenums 210 and 220. It is preferred that the valve 300 be able to stop in at least four distinct positions as shown by the quadrants 1, 2, 3 and 4. The four distinct positions include a first position when the valve sealing section 360 is disposed in quadrant 1. In this position, air is capable of flowing between the long balance plenum 240 through passage 402, the short balance plenum 210 through passage 404 and at least one of the said right side plenum 220 and the left side plenum 210. As shown in FIG. 4, the air can pass through connection plenum 280 into the right plenum 220.

The second valve position is when the sealing section 360 is disposed in quadrant 3. In this position air can flow between the short balance plenum 210 and the right side plenum 220.

The third valve position is when the sealing section 360 is disposed in quadrant 2. In the third position, air can flow between the long balance plenum 240 and the right side plenum 220.

The fourth valve position is when the sealing section is disposed in quadrant 4. In this position, air is not allowed to pass through the communication valve and no balancing between the right and left plenums 210 and 220 is provided.

With this valve structure and arrangement of plenums, it is possible to reduce the cost of the air intake system, reduce the packaging space for the engine and maintain proper fuel economy and performance of the engine.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An air intake system for a multi-cylinder combustion engine comprising:
    a left side plenum and a right side plenum, each of said left side plenum and said right side plenums connected to a plurality of air intake passages for passing air to a plurality of engine cylinders;
    a communication valve for connecting said left side plenum with said right side plenum;
    a short balance plenum connected between said communication valve and at least one of said left side plenum and said right side plenum; and
    a long balance plenum connected between said communication valve and at least one of said left side plenum and said right side plenum,
        wherein said communication valve includes a sealing section that is rotatable through 360 degrees around a valve body axis.

2. An air intake system for a multi-cylinder combustion engine according to claim 1, wherein said communication valve includes a valve body and a sealing section disposed for selectively closing air flow from said short balance plenum and said long balance plenum.

3. An air intake system for a multi-cylinder combustion engine according to claim 2, wherein said sealing section is disposed for closing air flow to at least one of said right side plenum and said left side plenum.

4. An air intake system for a multi-cylinder combustion engine according to claim 1, wherein said sealing section can rotate clockwise and counterclockwise around the valve body axis.

5. An air intake system for a multi-cylinder combustion engine according to claim 1, wherein said communication valve is disposed at an intersecting location of said short balance plenum, said long balance plenum and at least one of said right side plenum and said left side plenum.

6. An air intake system for a multi-cylinder combustion engine according to claim 5, wherein said communication valve includes a valve body and a sealing section disposed for selectively closing air flow from said short balance plenum and said long balance plenum.

7. An air intake system for a multi-cylinder combustion engine according to claim 6, wherein said sealing section is disposed for closing air flow to at least one of said right side plenum and said left side plenum.

8. An air intake system for a multi-cylinder combustion engine according to claim 7, wherein said sealing section is substantially sector-shaped in cross section and is movable between at least four distinct positions.

9. An air intake system for a multi-cylinder combustion engine according to claim 8, wherein the at least four distinct positions include:
    a first position where air is capable of flowing between said long balance plenum, said short balance plenum and at least one of said right side plenum and said left side plenum;
    a second position where air is capable of flowing between said short balance plenum and at least one of said right side plenum and said left side plenum;
    a third position where air is capable of flowing between said long balance plenum and at least one of said right side plenum and said left side plenum; and
    a fourth position where is air is not allowed to pass through said communication valve.

10. An air intake system for a multi-cylinder combustion engine according to claim 1, wherein said communication valve includes a sealing section that is movable between at least four distinct positions.

11. An air intake system for a multi-cylinder combustion engine according to claim 10, wherein the at least four distinct positions include:
   a first position where air is capable of flowing between said long balance plenum, said short balance plenum and at least one of said right side plenum and said left side plenum;
   a second position where air is capable of flowing between said short balance plenum and at least one of said right side plenum and said left side plenum;
   a third position where air is capable of flowing between said long balance plenum and at least one of said right side plenum and said left side plenum; and
   a fourth position where is air is not allowed to pass through said communication valve.

12. An air intake system for a multi-cylinder combustion engine according to claim 10, wherein the at least four distinct positions include:
   a first position where air is capable of flowing between said long balance plenum, said short balance plenum and at least one of said right side plenum and said left side plenum;
   a second position where air is capable of flowing between said short balance plenum and at least one of said right side plenum and said left side plenum;
   a third position where air is capable of flowing between said long balance plenum and at least one of said right side plenum and said left side plenum; and
   a fourth position where is air is not allowed to pass through said communication valve.

13. An air intake system for a multi-cylinder combustion engine, comprising:
   a left side plenum and a right side plenum, each of said left side plenum and said right side plenums connected to a plurality of air intake passages for passing air to a plurality of engine cylinders;
   a communication valve for connecting said left side plenum with said right side plenum;
   a short balance plenum connected between said communication valve and at least one of said left side plenum and said right side plenum;
   a long balance plenum connected between said communication valve and at least one of said left side plenum and said right side plenum; and
   wherein said communication valve includes a valve body having an axis and a sealing section rotatable through 360 degrees around the valve body axis and disposed for selectively closing air flow from said short balance plenum and said long balance plenum.

14. An air intake system for a multi-cylinder combustion engine according to claim 13, wherein said sealing section is disposed for closing air flow to at least one of said right side plenum and said left side plenum.

15. An air intake system for a multi-cylinder combustion engine according to claim 13, wherein said sealing section can rotate clockwise and counterclockwise around the valve body axis.

16. An air intake system for a multi-cylinder combustion engine according to claim 13, wherein said communication valve is disposed at an intersecting location of said short balance plenum, said long balance plenum and at least one of said right side plenum and said left side plenum.

17. An air intake system for a multi-cylinder combustion engine according to claim 13, wherein said communication valve includes a sealing section that is movable between at least four distinct positions.

18. An air intake system for a multi-cylinder combustion engine according to claim 17, wherein the at least four distinct positions include:
   a first position where air is capable of flowing between said long balance plenum, said short balance plenum and at least one of said right side plenum and said left side plenum;
   a second position where air is capable of flowing between said short balance plenum and at least one of said right side plenum and said left side plenum;
   a third position where air is capable of flowing between said long balance plenum and at least one of said right side plenum and said left side plenum; and
   a fourth position where is air is not allowed to pass through said communication valve.

19. An air intake system for a multi-cylinder combustion engine, comprising:
   a left side plenum and a right side plenum, each of said left side plenum and said right side plenums connected to a plurality of air intake passages for passing air to a plurality of engine cylinders;
   a communication valve for connecting said left side plenum with said right side plenum;
   a short balance plenum connected between said communication valve and at least one of said left side plenum and said right side plenum;
   a long balance plenum connected between said communication valve and at least one of said left side plenum and said right side plenum; and
   wherein said communication valve includes a valve body having an axis and a sealing section rotatable through 360 degrees around the valve body axis and disposed for selectively closing air flow from said short balance plenum and said long balance plenum, said communication valve is disposed at an intersecting location of said short balance plenum, said long balance plenum and at least one of said right side plenum and said left side plenum, and said communication valve includes a sealing section that is movable between at least four distinct positions.

* * * * *